United States Patent [19]

Parker et al.

[11] 4,070,183
[45] Jan. 24, 1978

[54] METHODS OF SEPARATING AND RECOVERING COPPER FROM MATERIALS CONTAINING COPPER

[75] Inventors: Alan James Parker, South Perth; David Michael Muir, Palmyra, both of Australia

[73] Assignee: Anumin Pty. Ltd., Canberra, Australia

[21] Appl. No.: 705,100

[22] Filed: July 14, 1976

[30] Foreign Application Priority Data

July 15, 1975 Australia .......................... 2367/75

[51] Int. Cl.² .......................................... C22B 15/12
[52] U.S. Cl. .......................................... 75/117; 75/108; 75/115; 204/106; 204/108; 423/41; 423/547
[58] Field of Search ............... 75/108, 115, 117, .5 A; 423/36, 41, 547; 204/106, 108

[56] References Cited

U.S. PATENT DOCUMENTS

| | | | |
|---|---|---|---|
| 3,865,744 | 2/1975 | Parker et al. | 75/117 X |
| 3,937,657 | 2/1976 | Parker et al. | 204/108 |
| 3,961,028 | 6/1976 | Parker et al. | 204/106 X |
| 3,966,890 | 6/1976 | Parker et al. | 204/106 X |

Primary Examiner—G. Ozaki
Attorney, Agent, or Firm—Fleit & Jacobson

[57] ABSTRACT

Cuprous sulphate solutions, suitable for thermal or electrochemical disproportionation to yield copper, are obtained by dissolving copper sulphites, such as Chevreul's salt or cuprous ammonium sulphite, in acetonitrile-water or 2 hydroxycyanoethane-water mixtures, preferably in the presence of cupric sulphate. This discovery is capable of a number of applications, one of which is the recovery of copper from chalcopyrite by the following five steps. An oxidizing roast of chalcopyrite such as to produce either cupric sulphate and/or copper oxide, leaching of cupric sulphate from the calcine, precipitation of Chevreul's salt and/or other copper sulphites with a soluble salt of sulphurous acid, including bisulphites, dissolution of the copper sulphite as cuprous sulphate, using cupric sulphate in an acetonitrile-water solution as oxidant; precipitation of pure copper by thermal disproportionation of the cuprous sulphate solution. Acetonitrile and acidic cupric sulphate solution may be recycled. Advantages over conventional processes, such as roast, leach-electrowin, or smelt, convert, electrorefine, include lower cost, lower energy consumption, sulphur removal as ammonium sulphate or gypsum, rather than as sulphur dioxide, and rapid throughput. The net reaction is:

$$2CuFeS_2 + 4H_2O + \frac{15}{2}O_2 + 8NH_2 \rightarrow 2Cu + 4(NH_4)_2SO_4 + Fe_2O_3$$

8 Claims, 3 Drawing Figures

METHODS OF SEPARATING AND RECOVERING COPPER FROM MATERIALS CONTAINING COPPER This invention relates to methods of preparing from copper sulphates and sulphites, solutions of cuprous sulphate which are suitable for recovery of copper by disproportionation and the application of the method to the recovery of copper from materials containing copper and in particular chalcopyrite concentrates.

BACKGROUND OF INVENTION

It has long been known (see Habashi F. and Dugdale R., Metall, 28, 129 (1974) — Reference 1) that a variety of copper sulphites, including cupric-cuprous sulphite (Chevreul's salt), can be precipitated from solutions of cupric sulphate, using sulphur dioxide, sulphurous acid or soluble salts of sulphurous acid as the source of sulphite ion. Copper sulphites have a variety of stoichiometries and some contain both copper (II) and copper (I), so it is difficult to define them other than as those salts which are precipitated from copper salt solutions in water by addition of soluble salts of sulphurous acid, which contains sulphite ions. But all are potentially useful intermediates in copper processing. This observation has proved difficult to utilize in the extractive metallurgy of copper, because effective reduction of copper sulphites to metal has required elevated pressures and temperatures well above 100° C (see reference 1 above and Arbiter N., Milligan D., and McClincy, R., I, Chem E. Symposium Series No. 42, 1.1 (1975) — Reference 2). Reduction is often incomplete. Recent work has shown that cuprous ammonium sulphites can be precipitated from copper ammine salt solutions obtained by the oxidative ammonia leaching of chalcopyrite (see Reference 2 above). These were converted to copper metal by heating in an autoclave at 150° C and 150 psig. It has also been shown that solutions of cuprous sulphate in water containing per mole of cuprous ion at least 3 moles of certain organic nitriles, notably acetonitrile and 2-hydroxycyanoethane, can be disproportionated either thermally (if acetonitrile or other volatile nitriles) to give particulate copper and cupric sulphate solutions or electrochemically (if acetonitrile or 2-hydroxycyanoethane) to give copper cathodes and cupric sulphate solutions, i.e. $Cu_2SO_4 \rightarrow CuSO_4 + Cu$. Solutions of cuprous sulphate in water containing organic nitriles have considerable value as a source of copper (see Parker A. J., Search, 4, 426 (1973) — Reference 3). Thus a method of converting cupric sulphate and slightly soluble copper sulphites to solutions of cuprous sulphate in water containing organic nitriles, has useful applications.

SUMMARY OF INVENTION

In one form the invention resides in a method of preparing cuprous sulphate solutions suitable for thermal or electrochemical disproportionation which comprises dissolving copper sulphites such as Chevreul's salt or copper ammonium sulphites in acetonitrile-water or 2-hydroxycyanoethane-water mixtures, the amount of acetonitrile or 2-hydroxycyanoethane being at least sufficient to stabilize the resulting cuprous sulphate solution. Preferably the amount of organic nitrile is greater than 3 moles per mole of $Cu^+$.

In another form, the invention resides in a method of preparing cuprous sulphate solutions suitable for thermal or electrochemical disproportionation which comprises dissolving copper sulphites such as Chevreul's salt in acetonitrile-water or 2-hydroxycyanoethane-water mixtures in the presence of cupric sulphate, the amount of acetonitrile or 2-hydroxycyanoethane being at least sufficient to stabilize the resulting cuprous sulphate solution.

In another form the invention resides in a method of preparing cuprous sulphate solutions suitable for thermal or electrochemical disproportionation which comprises treating a copper sulphate solution with soluble salts of sulphurous acid or with sulphurous acid to precipitate copper sulphites such as Chevreul's salt or cuprous ammonium sulphite by known processes, separating the salt from the supernatant liquors and dissolving it in an acetonitrile-water or 2-hydroxycyanoethane-water mixture containing cupric sulphate, the amount of acetonitrile or 2-hydroxycyanoethane being sufficient to stabilize the cuprous ion with respect to its disproportionation. It should be noted that 2-hydroxycyanoethane is suitable only in the case where the solution is electrochemically disproportionated, because it is a high boiling nitrile and cannot be distilled from aqueous solution.

In yet another form the invention resides in a method of recovering copper from copper sulphides including chalcopyrite, which comprises roasting the copper sulphide to produce a calcine containing acid soluble copper salts, such as $CuSO_4$ and $CuO$, leaching the calcine by known methods to produce a solution of cupric sulphate, treating the cupric sulphate solution with a soluble salt of sulphurous acid or with sulphurous acid by known methods to produce copper sulphites such as Chevreul's salt or cuprous ammonium sulphite, separating the copper sulphite from the supernatant liquor and dissolving it in an acetronitrile-water or 2-hydroxycyanoethane-water mixture containing cupric sulphate to produce a cuprous sulphate solution and disproportionating the cuprous sulphate solution to produce copper.

The sulphur dioxide produced during the oxidative roasting of copper sulphides may be absorbed in a solution of a water soluble base such as acqueous ammonia, sodium hydroxide, or sodium carbonate to produce a water soluble salt of sulphurous acid which may be used in the production of the copper sulphites such as Chevreul's salt or cuprous ammonium sulphite, whilst the cupric sulphate and acetonitrile or 2-hydroxycyanoethane from the disproportiionation of the cuprous sulphate may be recycled.

BRIEF DESCRIPTION OF THE DRAWINGS

The manner in which the foregoing and other objectives are achieved in accordance with the present invention will be better understood in view of the following detailed description and accompanying drawings wherein.

DESCRIPTION

Figure 1:
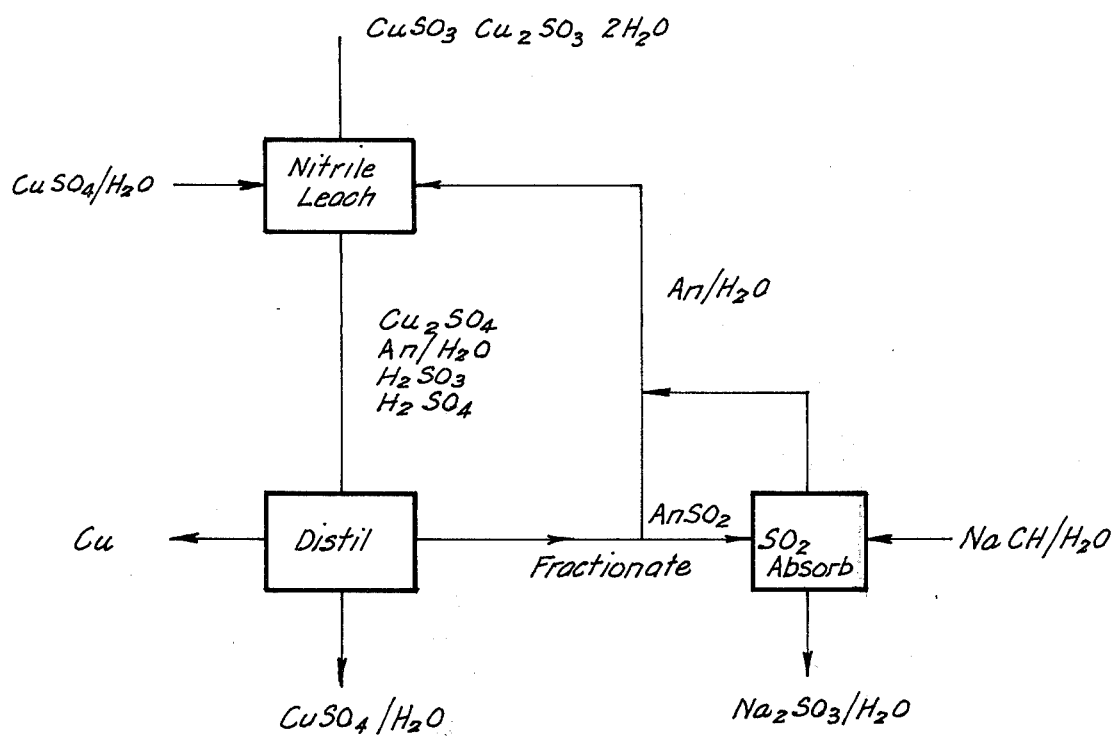
FIG. 1 is a schematic flow diagram, shown in elevation, illustrating the process steps for the production of copper from Chevreul's salt in accordance with the first method embodiment of the invention.
Figure 2:
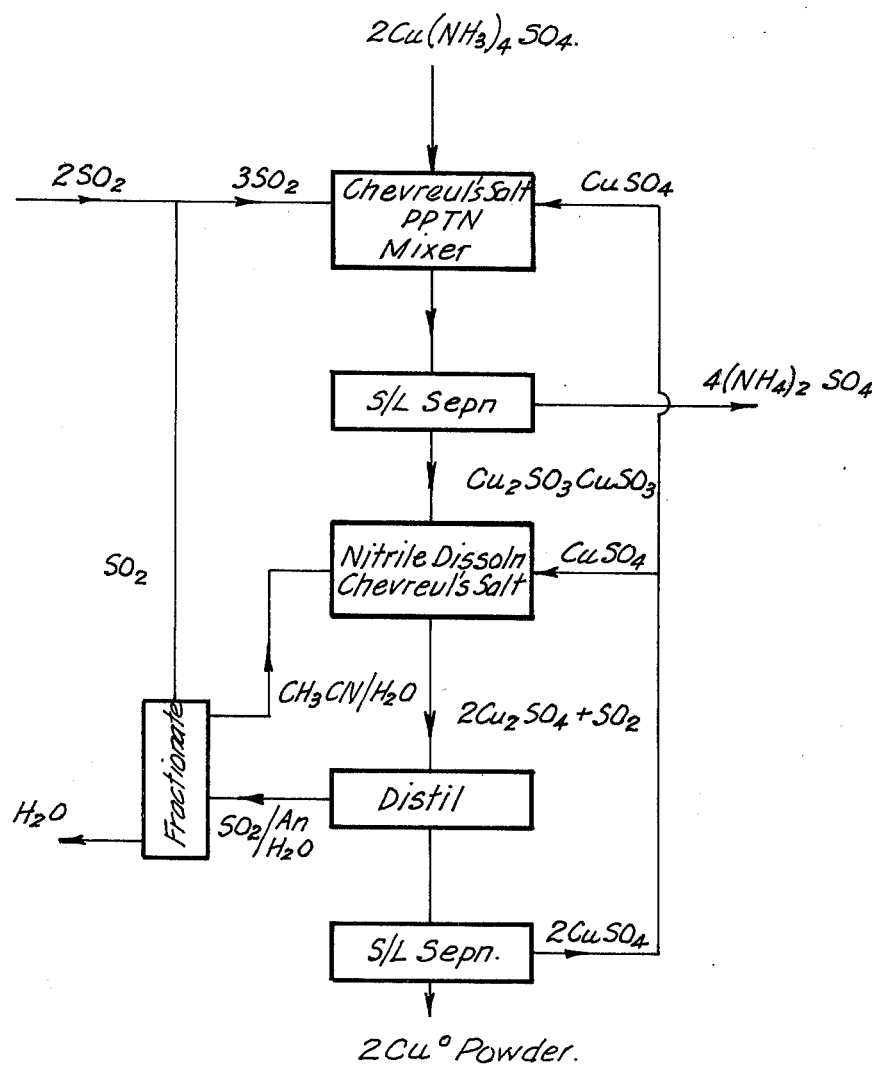
FIG. 2 is a schematic flow diagram, shown in elevation, illustrating the process steps for the production of copper from copper ammonium sulphate in accordance with a further method embodiment of the present invention.
Figure 3:
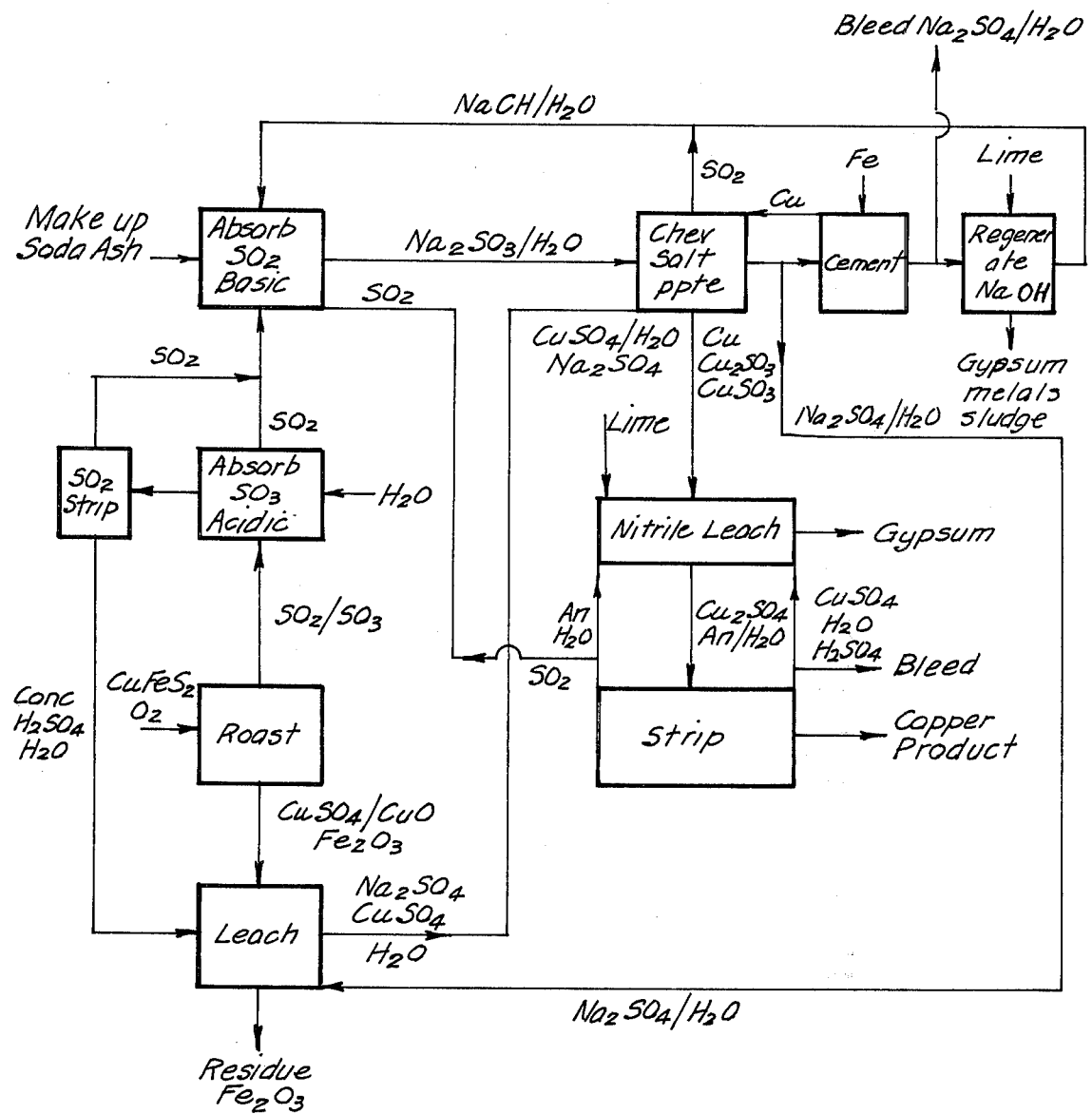
FIG. 3 is a schematic flow diagram, shown in elevation, illustrating the process steps for the production of copper from copper ore by way of the Chevreul's salt procedure in accordance with a further embodiment of the present invention.

It has been found that the presence of acetonitrile or 2-hydroxycyanoethane strongly enhances the solubility of Chevreul's salt and other cuprous salts, including $CuNH_4SO_3$ in water. The reaction is less useful but still possible in the presence of ammonium ions ($CuNH_4SO_3$) than with Chevreul's salt because ammonium sulphate which is a product of the dissolution decreases the solubility of acetonitrile in water and sometimes two layers of solvent form. It has been found that (equation 1) Chevreul's salt under ambient conditions dissolves readily in water containing at least 3 moles of acetonitrile per mole of copper produced, to give a solution of cuprous sulphate and cuprous sulphite. Naturally the rate and extent of dissolution increases at higher temperatures.

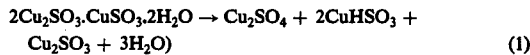

$$2Cu_2SO_3 \cdot CuSO_3 \cdot 2H_2O \rightarrow Cu_2SO_4 + 2CuHSO_3 + Cu_2SO_3 + 3H_2O) \quad (1)$$

Cuprous ammonium sulphite gives a solution of cuprous sulphate, cuprous sulphite and ammonium sulphite in water containing acetonitrile or 2-hydroxycyanoethane.

An excess of Chevreul's salt gave a solution containing 20 g/liter cuprous ion at 25° C and 35 g/liter Cu+ at 50° C when treated with water containing 5.8 M acetonitrile. On distillation of this solution, some $SO_2$ was evolved and the acidity increased to 0.04 molar H+. Under otherwise identical conditions, but in the absence of acetonitrile less than 2 g/liter of copper could be dissolved from Chevreul's salt.

Distillation of the acetonitrile from one liter of the above acetonitrile-containing solution from reaction (1) at 50° C with the addition of sulphuric acid such as to maintain a pH of 2 or less gave 17 g of particulate copper and blue cupric sulphate solution. Some sulphur dioxide was evolved.

Another useful method of preparing a cuprous sulphate solution is to react a copper sulphite such as Chevreul's salt with various proportions of cupric sulphate in water containing acetonitrile. The sulphite ion reduced cupric sulphate in the presence of acetonitrile provided that the pH is above 1. The proportion of acetonitrile should be at least 3 moles per mole of Cu+ produced and preferably greater. The reaction proceeds at 25° C but faster reactions and higher concentrations of cuprous ion (up to 160 g/liter) can be obtained if reaction is at 50°–70° C. The resulting cuprous sulphate solution is acidic. Distillation of acetonitrile gives copper if the pH is maintained in the vicinity of and preferably below 2 during distillation, the cupric sulphate and acetonitrile are recycled if necessary. The reaction is thought to be as follows:

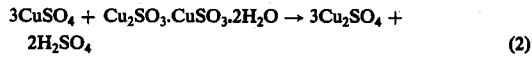

$$3CuSO_4 + Cu_2SO_3 \cdot CuSO_3 \cdot 2H_2O \rightarrow 3Cu_2SO_4 + 2H_2SO_4 \quad (2)$$

The final acidity of the solution depends on the proportion of Chevreul's salt to cupric sulphate, the pH being lower the greater the proportion of cupric sulphate according to equation 2. A desirable ratio is 3 moles of $CuSO_4$ per mole of Chevreul's salt. The pH preferably should not go below 1 during reaction, otherwise reaction 2 is incomplete, probably because of acid decomposition of Chevreul's salt to give sulphurous acid. Reactions 1 and 2 produce various amounts of cuprous sulphate, according not only to the proportions of cupric sulphate and Chevreul's salt, but also to the concentration of acetonitrile, the temperature, and the pH of the solution. Some relevant data are in Table I.

Table I:

| Formation of cuprous sulphate from excess Chevreul's salt and cupric sulphate at 25° C in acetonitrile-water. | | | | | |
|---|---|---|---|---|---|
| $(CH_3CN)$ moles liter$^{-1}$ | 0 | 1.95 | 3.90 | 5.85 | 8.00[c] |
| $(CuSO_4)$ moles liter$^{-1}$ | 0.63 | 0.63 | 0.63 | 0.63 | excess[a] |
| $(Cu^+)$[a] g liter$^{-1}$ | 0 | 33 | 55 | 77 | 140[c] |
| Copper g[b] | 0 | 16 | 22.5 | 38.5 | 70 |

[a] As sulphate
[b] Copper produced by thermal disproportionation of one liter of solution.
[c] At 65° c after 3 hours, total copper ($Cu^+ + Cu^{2+}$) is 158 g/l.

Table II shows the effect of varying the ratio of cupric sulphate to Chevreul's salt in a solution containing 3.90M acetonitrile and 0.05 M sulphur dioxide at 25° C. The greater the proportion of cupric sulphate to Chevreul's salt, the greater the acidity of the solutions from reaction (2). This variation of the proportion of $CuSO_4$ provides a means of controlling the acidity and this is important because in a continuous process the acid generated can be recycled to leach any basic calcine. The reaction has a half life of about 10 minutes and is usually complete after one hour at 25° C with stirring. However, the final proportions of Cu+ and Cu$^{2+}$ are dependent on the temperature. More cuprous sulphate is produced as the temperature is raised above 25° (Table I).

Table II:

| Effect of proportion of $CuSO_4$ to Chevreul's salt on reaction (2) at 25° C. | | | | |
|---|---|---|---|---|
| $(CH_3CN) = 3.9$ M; $(SO_2) = 0.5$ M: Reaction time 1 hour. | | | | |
| $(CuSO_4)$ M[a] | Chevreul's salt[a] M[a] | $(Cu^{2+}+Cu^+)$ g/liter[b] | $(Cu^+)$ g/liter[b] | $(H_2SO_4)$ M[b] |
| 0.00 | 0.31 | 49 | 46 | 0.01 |
| 0.16 | 0.26 | 58 | 51 | 0.02 |
| 0.32 | 0.21 | 58 | 51 | 0.06 |
| 0.50 | 0.15 | 59 | 50 | 0.14 |
| 0.64 | 0.10 | 38 | 23 | 0.13 |
| 0.80 | 0.05 | 38 | 23 | 0.18 |
| 1.00 | — | 34 | 16 | 0.28 |

[a] Initial concentrations
[b] Concentrations after 1 hours of reaction.

We believe that the optimum conditions for producing copper from Chevreul's salt via reaction (2) is to mix $CuSO_4$ and Chevreul's salt in the molar proportion of 2:1–3:1 at 50°–65° C in water containing 30–40% v/v acetonitrile to give a solution containing 100–120 g/l Cu+ as $Cu_2SO_4$, 15–30 g/l Cu$^{2+}$ as $CuSO_4$, 0.2 – 0.3 M $H_2SO_4$ and about 0.05 M $SO_2$. Thermal disproportionation, gives approximately 50–60 g of pure copper powder per liter of solution if the pH is below 2. Disproportionation at higher pH gives some copper oxides and copper sulphites together with the copper.

One method of producing copper sulphites is indicated below. Ammonium sulphite solution in water was prepared by bubbling $SO_2$ into 7 M ammonia to give a colourless, odourless solution of pH 6. This was mixed with various proportions of 0.5 M cupric sulphate solutions in water at 60° C to precipitate dark red crystalline Chevreul's salt or brick red $(NH_4)_2SO_3Cu_2SO_3 \cdot 2H_2O)$, depending on the molar ratio of cupric ion to ammonium sulphate. The final pH was 3.5 and some $SO_2$ was evolved.

With 1.5 moles $(NH_4)_2SO_3$ to one mole of cupric ion 96% of the copper was precipitated mainly as Chevreul's salt; with 2 moles of $(NH_4)_2SO_3$ to one mole of $Cu^{2+}$, 98% of the copper was precipitated mainly as $(NH_4)_2SO_3Cu_2SO_3.2H_2O$.

The reactions described above, when coupled with existing technology, provide two promising and rapid methods for converting copper sulphides to pure copper.

a. The concentrate is roasted by known methods (cf. USBM Report of Investigation 7996 — Reference 4) at a temperature of the order 500°–800° C preferably in a fluid bed roaster and preferably with oxygen enriched air, containing $SO_2$ and $SO_3$. The reaction is strongly exothermic, i.e. $\Delta H_{973K}$ is about 1400 kJ mole$^{-1}$ of $CuFeS_2$(10). The products are often CuO and some copper ferrite as well as the $CuSO_4$ shown in equation (5)

$$2CuFeS_2 + \frac{15}{2} O_2 \rightarrow 2CuSO_4 + 2SO_2 + Fe_2O_3 \quad \ldots (5)$$

according to the roasting conditions, but the ferrites can be kept very low and more than 95% of acid-soluble copper can be produced in such a roast. The effluent gas normally contains 5–12% $SO_2$, with some $SO_3$. The heat produced by the roast may be used for the thermal disproportionation step (Vide infra).

b. The calcine is leached of its copper by known methods to give a solution of cupric sulphate.

c. The $SO_2$ produced from the roast is converted to sodium or ammonium sulphite solution by scrubbing the exhaust gases from the roaster with solution of the appropriate base ($Na_2CO_3$, NaOH, $NH_3$).

d. The solutions (b) and (c) are mixed so as to precipitate copper sulphites, including $CuNH_4SO_3$, by known methods. The copper sulphite is separated from supernatant liquor.

e. The copper sulphites are dissolved in a solution of cupric sulphate containing water and approximately 40% v/v acetonitrile so as to give a solution of cuprous sulphate. This is filtered from any residual solids.

f. The cuprous sulphate solution is thermally disproportionated to give copper powder. Cupric sulphate and the acetonitrile-water distillate are recycled, with provision for a bleed circuit as necessary, to purify the recycling liquors.

COPPER PURITY

Thermal disproportionation of cuprous sulphate solutions has given coarse copper powder of 99.9% purity. Some relevant data is set out in Table III. They indicate that a relatively coarse, high purity copper powder, suitable for briquetting, should be a possible product of thermal disproportionation. A considerable amount of control over the type of powder produced by thermal disproportionation is possible.

Table III:

Purity (ppm) of copper powder produced from cupric sulphate solutions via precipitation of Chevreul's salt, dissolution as cuprous sulphate and thermal disproportionation of the resulting cuprous sulphate solution.

| Impurity | Ni | Fe | Mg | Zn |
|---|---|---|---|---|
| Solution[a] | 9000 | 9000 | 24000[c] | 9000 |

Table III:-continued

Purity (ppm) of copper powder produced from cupric sulphate solutions via precipitation of Chevreul's salt, dissolution as cuprous sulphate and thermal disproportionation of the resulting cuprous sulphate solution.

| Powder[b] | <5 | <5 | <7 | 4 |
|---|---|---|---|---|

[a]These elements were added as their sulphate to a cupric sulphate solution (40 g/liter $Cu^{2+}$) which was converted to Chevreul's salt, then as described herein dissolved in acetonitrile/water/$CuSO_4$ and thermally disproportionated to give copper powder of the purity shown below.
[b]by atomic absorption.
[c]This proportion of magnesium as sulphate was in the cuprous sulphate solution, prior to disproportionation.

It should be noted that the Parker method (Reference 3) of refining particulate copper via solutions of cuprous sulphate and disproportionation is applicable to particulate copper from $SO_2$ reduction of copper ammine solutions via thermal decomposition of copper sulphites (Reference 2).

The following specific examples will serve to further describe the invention.

EXAMPLE I 500 g of chalcopyrite concentrate supplied by Mt. Isa Mines Pty. Ltd. (25% Cu, 28% Fe, 32% S) was roasted with air to 690° C in a rotating kiln. When leached with dilute $H_2SO_4$ at constant pH 2 for 1 hour, 95% of the copper and 2% of the iron was extracted to give a solution containing 41 g/liter cupric ion. A 0.7 M magnesium bisulphite solution was prepared by bubbling $SO_2$ from a cylinder through magnesium carbonate. This was mixed at 70° C with an equal volume (500 ml) of the 0.7 M cupric sulphate solution leached from the calcine to precipitate 36 g of Chevreul's salt. A further 4 g of Chevreul's salt was obtained by adding a further 250 ml of 0.7 M Mg $(HSO_3)_2$.

The 40 g of Chevreul's salt was dissolved in 500 ml of 0.63 M cupric sulphate solution at 50° C containing 80 g acetonitrile. The solution contained 24 g/liter Mg as $MgSO_4$. After 10 minutes a clear lime green solution was produced. Steam distillation precipitated 14 g of a crystalline copper powder containing 10 ppm Mg, and less than 5 ppm Fe, Ni or Zn. The experiment was repeated using copper sulphate containing 9 g/liter Fe, Zn and Ni as sulphates and 24 g/l Mg as sulphate. The copper powder produced, contained 7 ppm Mg, 4 ppm Zn and <5 ppm Fe and Ni by atomic absorption.

EXAMPLE II

The above experiment was repeated to the stage of dissolution of the Chevreul's salt, prior to steam distillation at 1/10 the quantities indicated, using twice the concentration of 2-hydroxycyanoethane (MW = 70) in place of acetonitrile (MW = 41). A solution of 65 gl$^{-1}$Cu$^+$ as cuprous sulphate was obtained. 56 g of cuprous ammonium sulphite was dissolved in 500 ml of a solution containing 160 g acetonitrile water and 140 g of $CuSO_4.5H_2O$ at 65° C. A clear solution containing about 100 gl$^{-1}$ cuprous sulphate was obtained and distillation of the acidified solution gave particulate copper.

We claim:
1. A method for preparing cuprous sulphate solutions, said method comprising dissolving copper sulphites, such as Chevreul's salt and cuprous ammonium sulphite, in acetonitrile-water or 2-hydroxycyanoethane-water mixtures containing cupric sulphate, the amount of acetonitrile or 2-hydroxycyanoethane being sufficient to stabilize the resulting cuprous sulphate solution.

2. The method of preparing cuprous sulphate solutions as defined in claim 1 wherein the molar ratio of $CuSO_4$ to copper sulphite is 1 to 3.

3. The method of preparing cuprous sulphate solutions which comprises dissolving copper sulphites such as Chevreul's salt or cuprous ammonium sulphite in acetonitrile-water or 2-hydroxycyanoethane-water mixtures at temperatures below 95° C, the amount of acetonitrile or 2-hydroxycyanoethane being sufficient to stabilize the resulting cuprous sulphite solution.

4. The method as defined in claim 3 wherein the amount of acetonitrile or 2-hydroxycyanoethane is greater than 3 moles per mole of cuprous copper ions ($Cu+$).

5. A method for preparing cuprous sulphate solutions from cupric sulphate solutions which comprises treating a cupric sulphate solution with soluble salts of sulphurous acid or with sulphurous acid to precipitate slightly water soluble copper sulphites, separating the copper sulphites from the supernatant liquors and dissolving them in an acetonitrile-water or 2-hydroxycyanoethane-water mixture containing cupric sulphate to give cuprous sulphate solutions, the amount of acetonitrile or 2-hydroxycyanoethane being sufficient to stabilize the cuprous ion with respect to its disproportionation.

6. A method for recovering copper from copper sulphides which comprises roasting the copper sulphides under oxidizing conditions to produce a calcine containing copper salts, leaching the calcine to produce a solution of cupric sulphate, treating the cupric sulphate solution with a soluble salt of sulphurous acid to precipitate a copper sulphite, separating the copper sulphite from the supernatant liquor and dissolving it in an acetonitrile-water mixture containing cupric sulphate to produce a cuprous sulphate solution, then thermally disproportionating the cuprous sulphate solution to produce copper.

7. A method of recovering copper from sulfide bearing copper ores, concentrates or chalcopyrite comprising roasting the ore or other copper containing material to produce a calcine containing copper salts, leaching the calcine with water and/or dilute acid to produce a solution of cupric sulphate, treating the cupric sulphate solution with a soluble sulphite salt or with sulphurous acid to produce Chevreul's salt, separating the Chevreul's salt from the supernatant liquor and dissolving it in an acetonitrile-water or 2-hydroxycyanoethane-water mixture containing cupric sulphate to produce a cuprous sulphate solution at a pH of less than 4, and thermally or electrochemically disproportionating the cuprous sulphate solution to produce copper.

8. A method of recovering copper from sulfide bearing copper ores, concentrates or chalcopyrite comprising roasting the ore or other copper containing material to produce a calcine containing copper salts, leaching the calcine with water and/or dilute acid to produce a solution of cupric sulphate, heating the cupric sulphate solution with ammonium sulphite or other soluble sulphite or with sulphurous acid to a temperature in excess of 100° C to produce particulate copper, separating the particulate copper from the supernatant liquor and dissolving it in a solution of copper sulphate at a pH of less than 4.0 in water containing sufficient acetonitrile or 2-hydroxycyanoethane to stabilize the resulting cuprous sulphate solution, and thermally or electrochemically disproportionating the cuprous sulphate to produce copper.

* * * * *